United States Patent
Cohen

(10) Patent No.: US 11,281,427 B2
(45) Date of Patent: Mar. 22, 2022

(54) FAST SORT ENGINE

(71) Applicant: Ido Dov Cohen, Bat Yam (IL)

(72) Inventor: Ido Dov Cohen, Bat Yam (IL)

( * ) Notice: Subject to any disclaimer, the term of this patent is extended or adjusted under 35 U.S.C. 154(b) by 0 days.

(21) Appl. No.: 16/454,198

(22) Filed: Jun. 27, 2019

(65) Prior Publication Data

US 2020/0341732 A1 Oct. 29, 2020

Related U.S. Application Data

(60) Provisional application No. 62/837,780, filed on Apr. 24, 2019.

(51) Int. Cl.

| G06F 7/26 | (2006.01) |
|---|---|
| G06F 16/901 | (2019.01) |
| G06F 7/49 | (2006.01) |
| G06F 7/24 | (2006.01) |
| G06F 7/38 | (2006.01) |
| G06F 7/76 | (2006.01) |

(52) U.S. Cl.
CPC ............. *G06F 7/26* (2013.01); *G06F 7/24* (2013.01); *G06F 7/38* (2013.01); *G06F 7/49* (2013.01); *G06F 7/76* (2013.01); *G06F 16/901* (2019.01)

(58) Field of Classification Search
CPC .... G06F 7/24; G06F 12/0238; G06F 12/0862; G06F 16/2237; G06F 16/23; G06F 16/283; G06F 2212/1024; G06F 2212/7203; G06F 7/36; G06F 9/30032; G06F 9/30047; G06F 9/3881; G06F 16/284; G06F 16/24568; G06F 16/90344; G06F 7/22; G06F 17/30324; G06F 17/30345; G06F 17/30592
USPC .................................................. 707/752, 758
See application file for complete search history.

(56) References Cited

U.S. PATENT DOCUMENTS

| 5,396,622 | A | * | 3/1995 | Lee | ........................ G06F 7/24 |
| 5,440,734 | A | * | 8/1995 | Wagar | .................... G06F 7/24 |
| 5,546,390 | A | * | 8/1996 | Stone | .................... H04L 29/06 370/408 |
| 5,924,091 | A | * | 7/1999 | Burkhard | ................ G06F 7/24 |
| 6,351,758 | B1 | * | 2/2002 | Courtney | ............... G06F 7/768 708/404 |
| 7,446,681 | B2 | * | 11/2008 | Gunther | ............ G06F 16/2282 341/106 |
| 7,680,791 | B2 | * | 3/2010 | Callaghan | ........... G06F 16/284 707/999.007 |
| 7,743,060 | B2 | * | 6/2010 | Fontoura | .............. G06F 16/951 707/737 |

(Continued)

OTHER PUBLICATIONS

Goodrich, M. T., and Tamassia, R., "4.5 Bucket-Sort and Radix-Sort," Algorithm Design: Foundations, Analysis, and Internet Examples, John Wiley & Sons. pp. 241-243 (2002). (Year: 2002).*

(Continued)

*Primary Examiner* — Sheree N Brown

(74) *Attorney, Agent, or Firm* — Mark David Torche; Patwrite Law

(57) ABSTRACT

A method of sorting an array of data elements, the method includes assigning values associated with a monotonic function to the data elements, and sorting the array of data elements by sorting the monotonic function values using a least significant digit (LSD) Radix sort.

20 Claims, 14 Drawing Sheets

(56) References Cited

U.S. PATENT DOCUMENTS

| | | | |
|---|---|---|---|
| 7,801,903 B2* | 9/2010 | Furusho | G06F 16/24554 707/752 |
| 8,065,337 B2* | 11/2011 | Furusho | G06F 16/24554 707/796 |
| 9,171,032 B2* | 10/2015 | Asaad | G06F 16/901 |
| 9,177,006 B2* | 11/2015 | Asaad | G06F 16/901 |
| 9,858,179 B2* | 1/2018 | Chouery | G06F 7/22 |
| 9,928,261 B2* | 3/2018 | Bordawekar | G06F 9/30032 |
| 10,216,478 B2* | 2/2019 | Chu | G06F 7/24 |
| 2010/0106759 A1* | 4/2010 | Chen | G06F 17/142 708/404 |
| 2010/0312802 A1* | 12/2010 | Furusho | G06F 16/24554 707/803 |
| 2011/0051724 A1* | 3/2011 | Scott | H04L 45/00 370/389 |
| 2012/0095591 A1* | 4/2012 | Wilson | B07C 3/08 700/214 |
| 2013/0035782 A1* | 2/2013 | Norris | B07C 3/00 700/224 |
| 2014/0188906 A1* | 7/2014 | Muller | G06F 16/24556 707/752 |
| 2015/0212797 A1* | 7/2015 | Bordawekar | G06F 7/36 707/753 |
| 2015/0293957 A1* | 10/2015 | Bordawekar | G06F 16/23 707/753 |
| 2018/0144010 A1* | 5/2018 | Bordawekar | G06F 7/24 |

OTHER PUBLICATIONS

Arne Anderson, "A New Efficient Radix Sort", Department of Computer Science, Lund Univisity, Sweden, AMC, 1994. (Year: 1994).*

* cited by examiner

| IDX | 0 | 1 | 2 | 3 | 4 | 5 | 6 | 7 |
|---|---|---|---|---|---|---|---|---|
| VAL | 15 | 22 | 4 | 13 | 78 | 11 | 37 | 36 |

UNSORTED

402 → IDX row, 404 → VAL row

| IDX | 2 | 5 | 3 | 0 | 1 | 7 | 6 | 4 |
|---|---|---|---|---|---|---|---|---|
| VAL | 4 | 11 | 13 | 15 | 22 | 36 | 37 | 78 |

SORTED

412 → IDX row, 414 → VAL row

| IDX | 0 | 1 | 2 | 3 | 4 | 5 | 6 | 7 |
|---|---|---|---|---|---|---|---|---|
| OIDX | 2 | 5 | 3 | 0 | 1 | 7 | 6 | 4 |
| VAL | 4 | 11 | 13 | 15 | 22 | 36 | 37 | 78 |

402 → IDX, 412 → OIDX, 414 → VAL

FAST SORT ENGINE

RELATED APPLICATION

This application claims the benefit of priority from U.S. Provisional Patent Application No. 62/837,780 filed 24 Apr. 2019, the contents of which are incorporated herein by reference in their entirety.

FIELD AND BACKGROUND OF THE INVENTION

The present invention, in some embodiments thereof, relates to sort engines and, more particularly, but not exclusively, to a hardware implemented linear monotonic sort engine.

Radix sort is a non-comparative integer sorting algorithm that sorts data with integer keys by grouping keys according to individual digits which share the same significant position and value. A positional notation is required, but because integers may be used to represent strings of characters (e.g., names or dates) and specially formatted floating point numbers, radix sort is not limited to integers. The sort may be implemented to start at either the most significant digit (MSD) or least significant digit (LSD). For example, when processing the number 1234 while sorting an array of numbers, one may start with 1 as the MSD or with 4 as the LSD.

LSD radix sorts typically use the following sorting order: short keys come before longer keys, and then keys of the same length are sorted lexicographically. This coincides with the normal order of integer representations, such as the sequence 1, 2, 3, 4, 5, 6, 7, 8, 9, 10, 11.

MSD radix sorts use lexicographic order, which is suitable for sorting strings, such as words, or fixed-length integer representations. A sequence such as "b, c, d, e, f, g, h, i, j, ba" would be lexicographically sorted as "b, ba, c, d, e, f, g, h, i, j". If lexicographic ordering is used to sort variable-length integer representations, then the representations of the numbers from 1 to 10 would be output as 1, 10, 2, 3, 4, 5, 6, 7, 8, 9, as if the shorter keys were left-justified and padded on the right with blank characters to make the shorter keys as long as the longest key for the purpose of determining sorted order.

The radix sort may be performed using bucket sorting which is a sorting algorithm which distributes the elements of an array into a number of buckets. Each bucket is then sorted individually. The buckets sort generally involves the following steps: (a) set up an array of initially empty buckets; (b) go over the original array, putting each element in its bucket; (c) sort each non-empty bucket; and (d) visit the buckets in order and put all the elements back into the original array.

SUMMARY OF THE INVENTION

There is provided, in accordance with an embodiment of the present invention, a method of sorting an array of data elements, the method including assigning values associated with a monotonic function to the data elements, and sorting the array of data elements by sorting the monotonic function values using a least significant digit (LSD) Radix sort. The monotonic function may be a non-decreasing monotonic function. Alternatively, the monotonic function may be a non-increasing monotonic function. Optionally, the monotonic function values may be integers.

In some embodiments, the method may include creating an array of the monotonic function values. The method may additionally include creating an array of index values, each index value corresponding to a data element and to its assigned monotonic function value.

In some embodiments, the method may include sorting the data elements by sorting the array of index values using the LSD Radix sort.

In some embodiments, the method may include using LSD Radix sort buckets. The data elements may be sorted into the LSD Radix sort buckets by sorting the assigned monotonic function values. Optionally, the assigned monotonic function values may be arranged in an array.

There is provided, in accordance with an embodiment of the present invention, a system for sorting an array of data elements including a processor, and a non-transitory computer readable medium storing instructions executable in the processor and causing the processor to perform operations which may include assigning values associated with a monotonic function to the data elements, and sorting the array of data elements by sorting the monotonic function values using a least significant digit (LSD) Radix sort. The monotonic function may be a non-decreasing monotonic function. Alternatively, the monotonic function may be a non-increasing monotonic function. Optionally, the monotonic function values may be integers.

In some embodiments, the processor may create an array of the monotonic function values. The processor may also create an array of index values, each index value corresponding to a data element and to its assigned monotonic function value. The processor may sort the data elements by sorting the array of index values using the LSD Radix sort.

In some embodiments, the processor may use LSD Radix sort buckets and may sort the data elements into the LSD Radix sort buckets by sorting the assigned monotonic function values. Optionally, the assigned monotonic function values may be arranged in an array.

There is provided, in accordance with an embodiment of the present invention, a non-transitory computer readable medium storing instructions executable in a processor and causing the processor to perform operations which may include assigning values associated with a monotonic function to an array of data elements, and sorting the array of data elements by sorting the monotonic function values using a least significant digit (LSD) Radix sort.

BRIEF DESCRIPTION OF THE DRAWINGS

Some embodiments of the invention are herein described, by way of example only, with reference to the accompanying drawings. Details shown are for exemplary purposes and serve to provide a discussion of embodiments of the invention. The description and the drawings may be apparent to those skilled in the art how embodiments of the invention may be practiced.

FIG. 4A shows an exemplary table including an IDX array with index values and a VAL array with numerical values below the corresponding index values, according to an embodiment of the present invention;

FIG. 4B which shows an exemplary table including a rearranged IDX array with index values and a sorted VAL array with numerical values below the corresponding index values, according to an embodiment of the present invention;

FIG. 4C shows an exemplary table with the IDX array of FIG. 4A, the rearranged OIDX array, and the VAL array with the numerical values in ascending order, each below its corresponding OIDX, according to an embodiment of the present invention;

DETAILED DESCRIPTION

Figure 1:
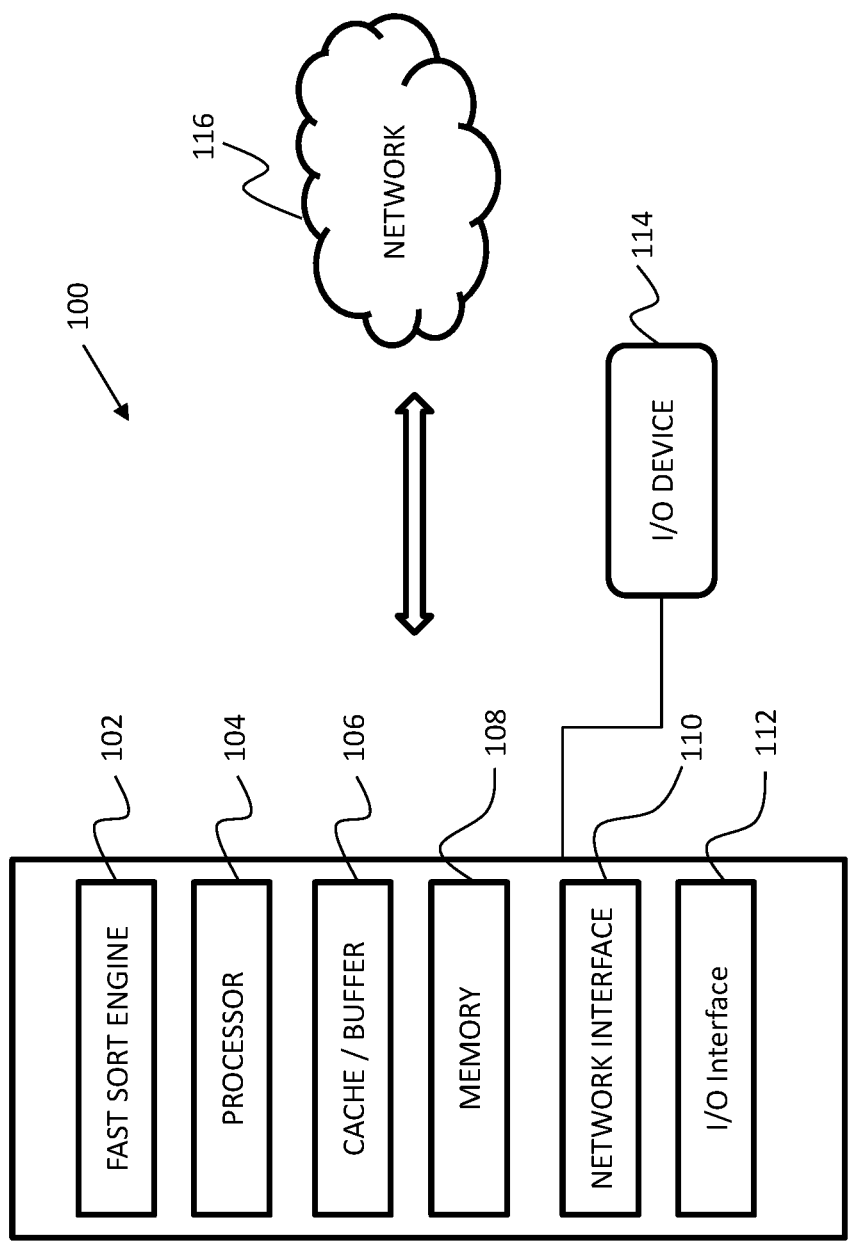
FIG. 1 schematically illustrates a block diagram of an exemplary computer system which may be used to practice the teachings disclosed herein, according to an embodiment of the present invention.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

A function $f$ is called a monotonically non-decreasing function if for all x and y such that x≤y one has $f(x) \leq f(y)$, so $f$ preserves the order. Likewise, a function is call monotonically non-increasing if, whenever x≤y one has $f(x) \geq f(y)$, so $f$ reverses the order.

Applicant has realized that the Radix sort, which has typically been limited for sorting integers and strings and therefore with limited application, may be used with non-decreasing and non-increasing monotonic functions to perform rapid sorting applicable to modern computational needs. Consequently, Applicant has devised a fast sort engine which applies a monotonic function on elements of an input array and then uses LSD radix to sort the monotonic function values and correspondingly the elements as well as their indices. By giving a numerical value to each element in the input array, the fast sort engine reduces the general sorting problem to a numerical sorting problem which may be solved with the LSD radix sort in linear runtime complexity. Since the function $f$ is monotonic, sorting the values of $f$ is equivalent to sorting the elements in the input array since the permutations applied to the monotonic function values array are exactly the permutations which may be applied to the input array in order to sort it. For convenience hereinafter, "input array" may also be referred to as "elements array".

Applicant has further realized that in lieu of using a numerical value array and an indices array, the fast sort engine may perform a LSD radix sort directly on the elements array. The LSD radix sort may use buckets that may contain elements instead of integers and may use the monotonic value corresponding to each element in the elements array to determine to which bucket the element will be assigned. The sort engine may sort the elements array as it sorts the monotonic function values array. Alternatively, the sort engine may associate the monotonic value with its corresponding element and sort the elements array only, using the monotonic value of each element to determine to which bucket of the LSD radix sort each element may be assigned.

Reference is now made to FIG. 1 which schematically illustrates a block diagram of an exemplary computer system 100 which may be used to practice the teachings disclosed herein, according to an embodiment of the present invention. Computer system 100 may include a Fast Sort Engine (FSE) 102, a processor 104, a cache/buffer 106, a memory 108, a network interface 110, an I/O interface 112, and at least one I/O device 114.

FSE 102 may be used to perform rapid sorting of elements in an elements array by applying a monotonic function to the elements of the array and sorting both the corresponding monotonic function values and the indices. The components of FSE 102 and its functioning is described in greater detail hereinafter with reference to FSE 200 shown in FIG. 2 and associated description.

Processor 104 may be a computing device for executing hardware instructions or software, and may include those stored in memory 108. Processor 104 may be any custom made or commercially available processor, a central processing unit (CPU), an auxiliary processor among several processors associated with computer system 100, a semiconductor based microprocessor (in the form of a microchip or chip set), a macroprocessor, or generally any device for executing instructions. Processor 104 may include a cache/buffer 106. Processor 104 may be configured to execute instructions stored within memory 108, to communicate data to and from the memory 108, and to generally control operations of computer system 100 pursuant to the instructions.

Memory 108 may include any one or combination of volatile memory elements (e.g., random access memory RAM, such as DRAM, SRAM, SDRAM, etc.) and nonvolatile memory elements (e.g., ROM, erasable programmable read only memory EPROM, electronically erasable programmable read only memory EEPROM, programmable read only memory PROM, tape, compact disc read only memory CD-ROM, disk, diskette, cartridge, cassette or the like, etc.). Moreover, memory 108 may incorporate electronic, magnetic, optical, and/or other types of storage media. Optionally, memory 108 may have a distributed architecture, where various components are situated remote from one another, but may be accessed by processor 104.

The instructions in memory 108 may include one or more separate programs, each of which may include an ordered listing of executable instructions for implementing logical functions. In the example of FIG. 1, the instructions in memory 108 may include any suitable operating system. The operating system may essentially control the execution of other computer programs and may provide scheduling, input-output control, file and data management, memory management, and communication control and related services.

Network interface 110 may serve to connect computer system 100 to a network 116. Network 116 may be an IP-based network for communication between the computer system 100 and any external server, client and the like via a broadband connection. Network 116 may transmit and receive data between computer system 100 and external systems. Optionally, network 116 may be a managed IP network administered by a service provider. Network 116 may be implemented in a wireless fashion, e.g., using wireless protocols and technologies, such as Wi-Fi, WiMAX, etc. Network 116 may also be a packet-switched network such as a local area network, wide area network, metropolitan area network, Internet network, or other similar type of network environment. Network 116 may be a fixed wireless network, a wireless local area network (LAN), a wireless wide area network (WAN) a personal area network (PAN), a virtual private network (VPN), intranet or other suitable network system and may include equipment for receiving and transmitting signals.

I/O interface 112 may serve to output processed data to an output device connected to the computer system and to receive data entry from an input device, both devices shown generically in the figure as I/O device 114. I/O device 114 may include a display, a conventional keyboard and mouse, a scanner, a printer, an imaging device, a microphone, among many other devices which may serve to either output processed data or may be used for data entry. I/O device 114 may further include devices that communicate both inputs and outputs, for example, a network interface card (NIC) or a modulator/demodulator, a radio frequency (RF) or other transceiver, a telephonic interface, a bridge, a router, and the like.

Figure 2:
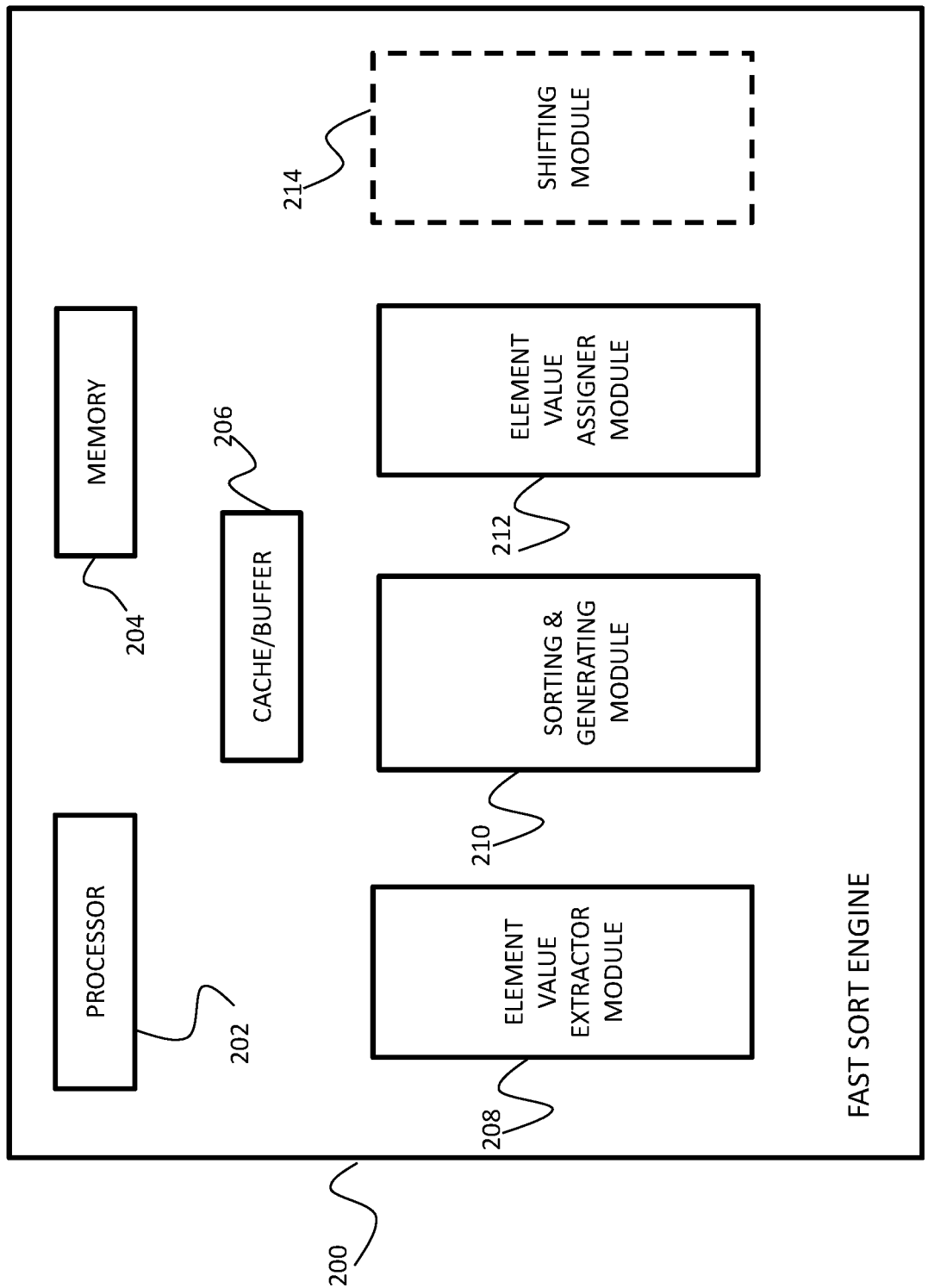
FIG. 2 schematically illustrates a block diagram of a fast sort engine (FSE), according to an embodiment of the present invention.

Reference is now made to FIG. 2 which schematically illustrates a block diagram of FSE 200, according to an embodiment of the present invention. FSE 200 may include a processor 202, a memory 204, a cache/buffer 206, an element value extractor module 208, an index sorting & generating module 210, an element value assigner module 212, and an optional index shifting module 214. FSE 200 and FSE 102 in FIG. 1 may include the same components and may perform the same functions.

The operation of FSE 200 may be described in greater detail with reference to FIGS. 3-10B. A non-decreasing monotonic function may be applied on the elements of an array and then LSD radix may be used to sort the monotonic function values and optionally order the indices associated with the elements in the array. The monotonic function may be selected so that $f(x)$ returns integer numbers. It may be readily appreciated by the skilled person that, although the operation is described with reference to use of a non-decreasing monotonic function, a non-increasing monotonic function may also be used in lieu of the non-decreasing monotonic function.

In some embodiments, a function $g(x)$ which returns floating point values may be required. In these cases, for example, the function $g(x)$ may be converted to a function that returns integer values and may remain monotonic by returning the integer value which corresponds to the floating—point value binary representation. If the floating-point value is negative, the function may remain monotonic by returning the opposite number of the integer value which corresponds to the binary representation of the opposite number of the floating-point value (the values may be different).

In some embodiments, a method of the present invention may include use of two separate arrays. A first array may hold index values which may point to a second array which may hold monotonic function numerical values corresponding to the elements, as described further on below with reference to FIGS. 3-9. The first array may be referred to hereinafter as indices array and the second array as numerical value array. Alternatively, as described with reference to FIGS. 10A and 10B further on below, instead of the indices array, the first array may be the input array itself which holds the elements and the second array may be the numerical value array. For convenience hereinafter, "monotonic function numerical value" may be used interchangeably with "monotonic function value" and "numerical value".

Processor 202 may control the operation of all components in the FSE including data flow between memory 204, cache/buffer 206, and the multiple modules 208-214. Processor 202 may additionally control all FSE 200 component operations as required to sort the array of elements stored in memory 204. Processor 202 may additionally interface with processor 104 in computer system 100 for data transfer between the FSE and other components of the computer system. In some embodiments, the functions carried out by processor 202 may be provided by processor 104.

Memory 204 may store an unsorted input array of unsorted elements prior to, and during the monotonic sorting operation. It may additionally store the sorted array following monotonic sorting. Memory 204 may additionally include executable instructions associated with the operation of FSE 200. Optionally, the functions carried out by memory 204 may be provided by memory 108. Cache/buffer 206 may temporarily store the monotonic function value associated with an element during the sorting operation. Optionally, the functions carried out by cache/buffer 206 may be provided by cache/buffer 106 in computer system 100.

Figure 3:
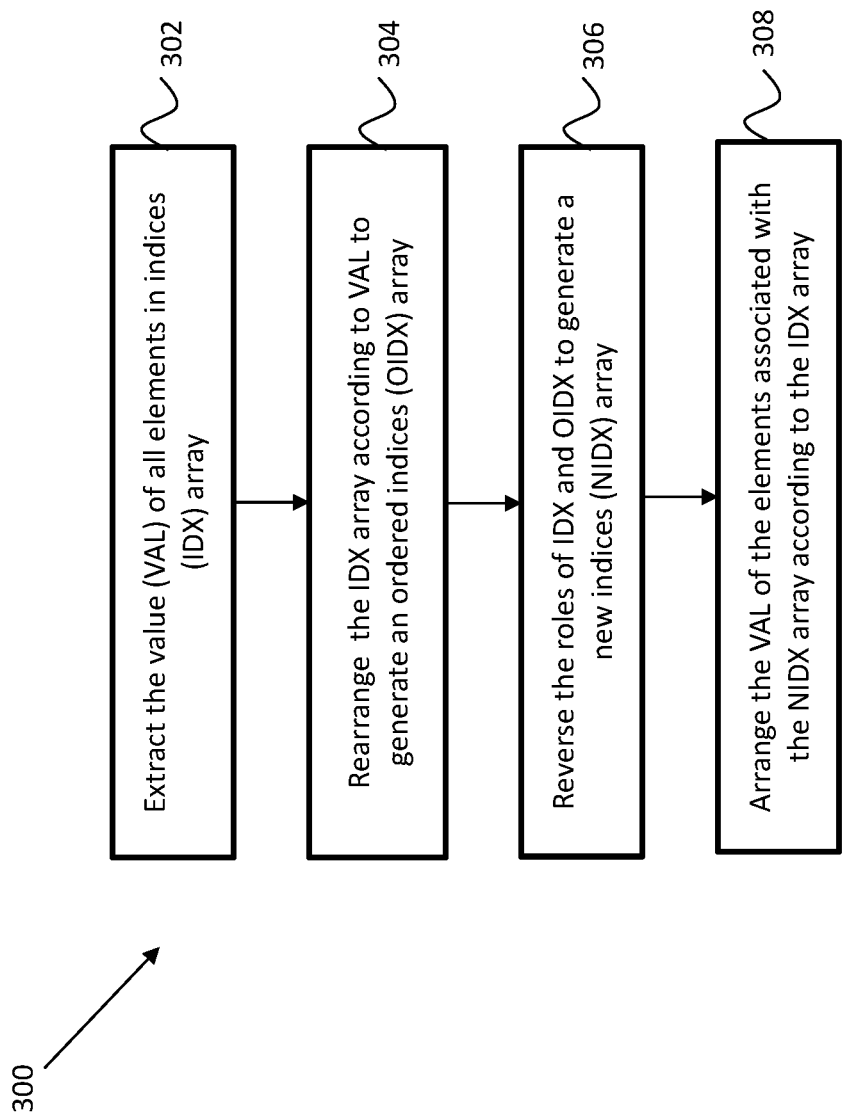
FIG. 3 schematically illustrates a flow chart of a method of monotonically sorting an array of elements using an element value extractor module, an index sorting & generating module, and an element value assigner module, all in the FSE, according to an embodiment of the present invention.

The actual monotonic sorting operation is carried out by element value extractor module 208, sorting & generating module 210, element value assigner module 212, and optional shifting module 214. Reference is now also made to FIG. 3 which schematically illustrates a flow chart of a method 300 of monotonically sorting an array of elements with modules 208-212 using an index array and a monotonic numerical value array, according to an embodiment of the present invention. Use of shifting module 214 together with modules 208-212 will be described later on with reference to FIG. 7.

At 302, element value extractor module 208 may apply the monotonic function to the elements, may build the numerical value array, and may extract the monotonic function numerical value (VAL) associated with each of the unsorted elements from the numerical value array according to the indices (IDX) array. The extraction may be sequential and may follow the order of the indices in the IDX array (e.g.

ascending order). An example of this operation is shown in FIG. 4A which shows an exemplary table 400 including the IDX array 402 with the index values and the VAL array 404 with the monotonic function numerical value associated with each of the elements below the corresponding index value.

At 304, sorting and generating module 210 may sort the numerical values in the numerical value array in numerical order (e.g. ascending order) according to the VAL. It may correspondingly rearrange the IDX in the indices array accordingly to generate an "ordered" indices (OIDX) array. Each permutation made on the numerical value array may correspondingly be made on the elements array and on the indices array as well. An example of the rearranging operation is shown in FIG. 4B which shows an exemplary table 410 including the rearranged IDX array 412 with the index values and the sorted VAL array 414 with the monotonic function numerical value below the corresponding index value. VAL array 414 is arranged in numerically ascending order. FIG. 4C shows an exemplary table 420 with the original IDX array 402, the rearranged OIDX array 412, and the VAL array 414 with the monotonic function numerical values in ascending order, each below its corresponding OIDX.

Figure 5A:
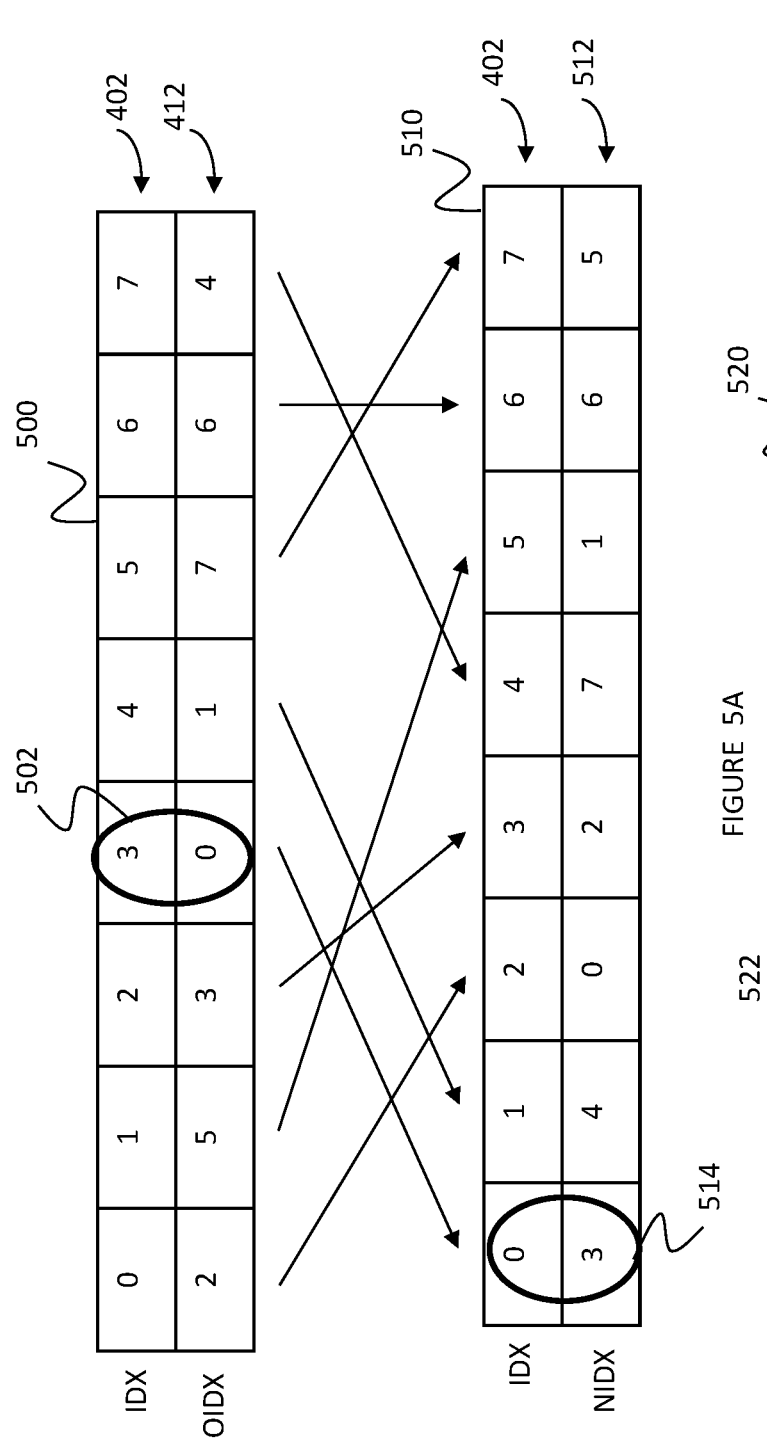
FIG. 5A shows an exemplary table including the IDX array and the OIDX array transformed to show the reversal of the roles between the IDX array and OIDX array to generate a new indices (NIDX) array, according to an embodiment of the present invention.

At 306, sorting and generating module 210 may transform IDX and OIDX by reversing their roles to generate a new indices (NIDX) array. An example of the transformation operation is shown in FIG. 5A which shows an exemplary table 500 including IDX array 402 and OIDX array 412 transformed into table 510 which shows the reversal of the roles between the IDX array 402 and OIDX array 412 to generate a new indices (NIDX) array 512. For example, IDX=3, OIDX=0, indicated by 502 is transformed to IDX=0, NIDX=3, indicated by 514.

Figure 5B:
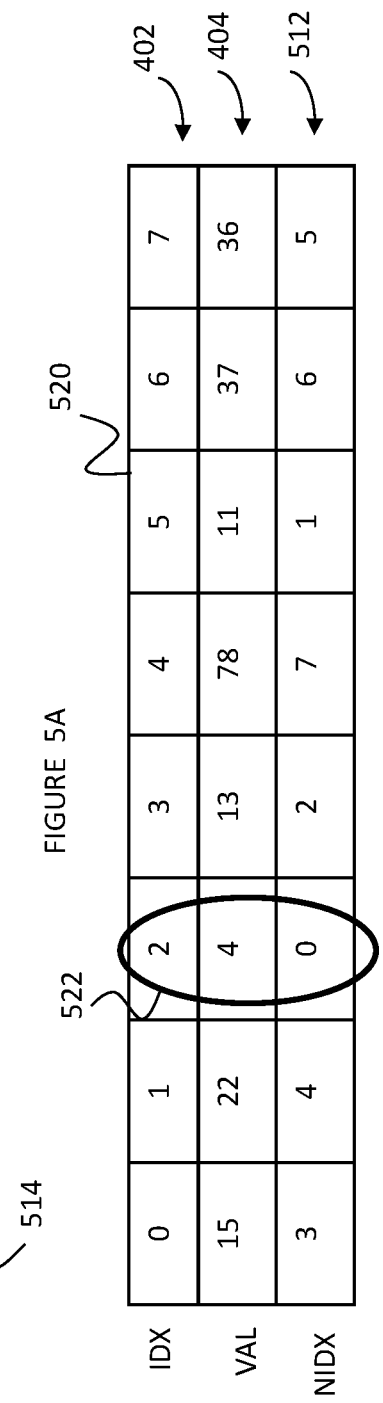
FIG. 5B shows the original IDX array, the VAL array corresponding to the IDX array, and the NIDX array with the index values which are to be assigned the corresponding numerical values in the VAL array, according to an embodiment of the present invention.

At 308, element value assigner module 212 may assign the elements in the elements array and their corresponding numerical values in the numerical value array associated with the original IDX array the corresponding new index value in the NIDX array. An example, of the assignment is shown in FIG. 5B which shows the original IDX array 402, the VAL array 404 corresponding to the IDX array, and the NIDX array 512 with the index values which are to be assigned the corresponding numerical values in the VAL array. For example, as shown in 522, VAL=4 having an original IDX=2 may now be assigned NIDX=0.

Figure 6A:
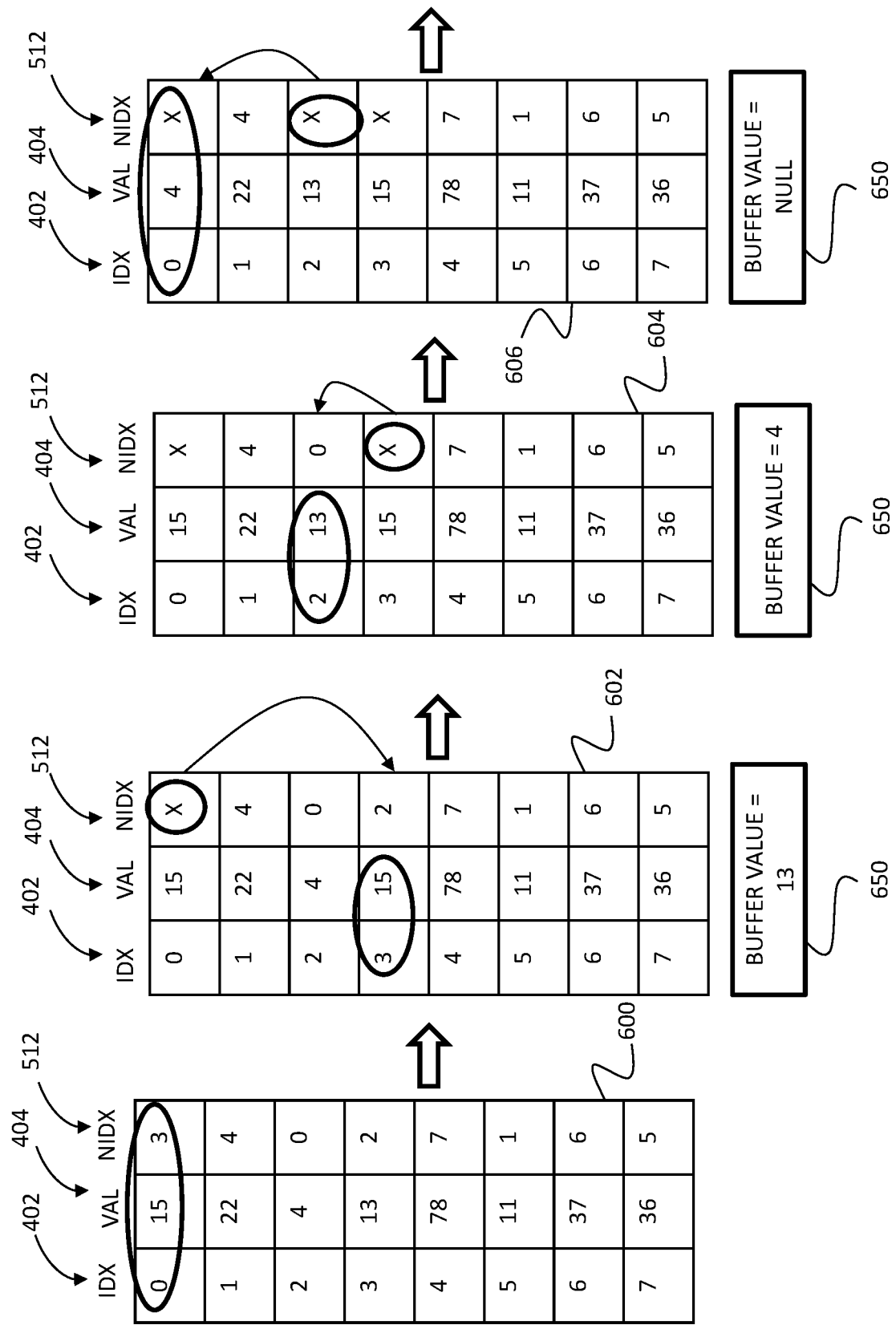
FIGS. 6A-6C show an example of the complete sequence of index assignments carried out by element value assigner module, according to an embodiment of the present invention.
Figure 6B:
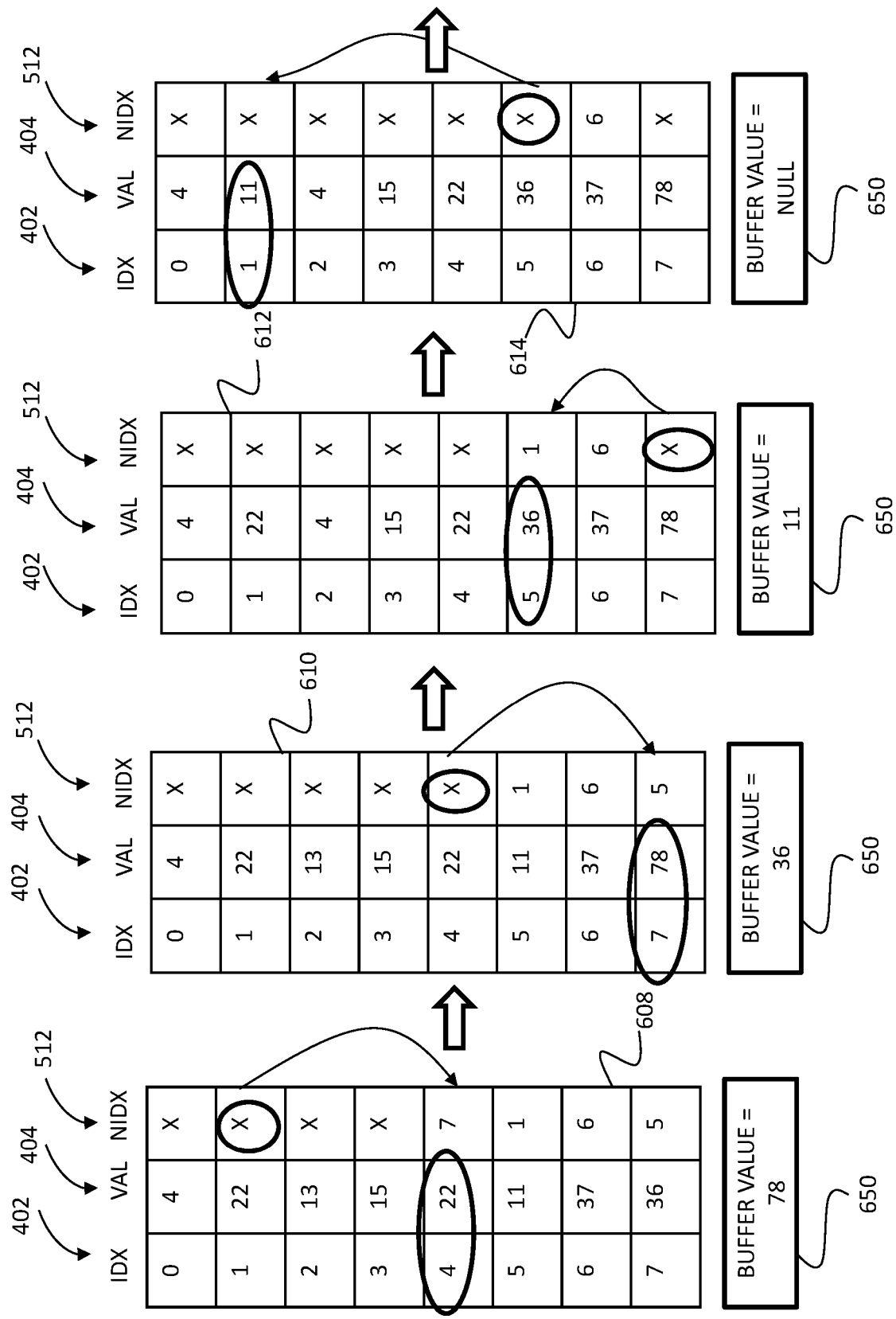
Figure 6C:
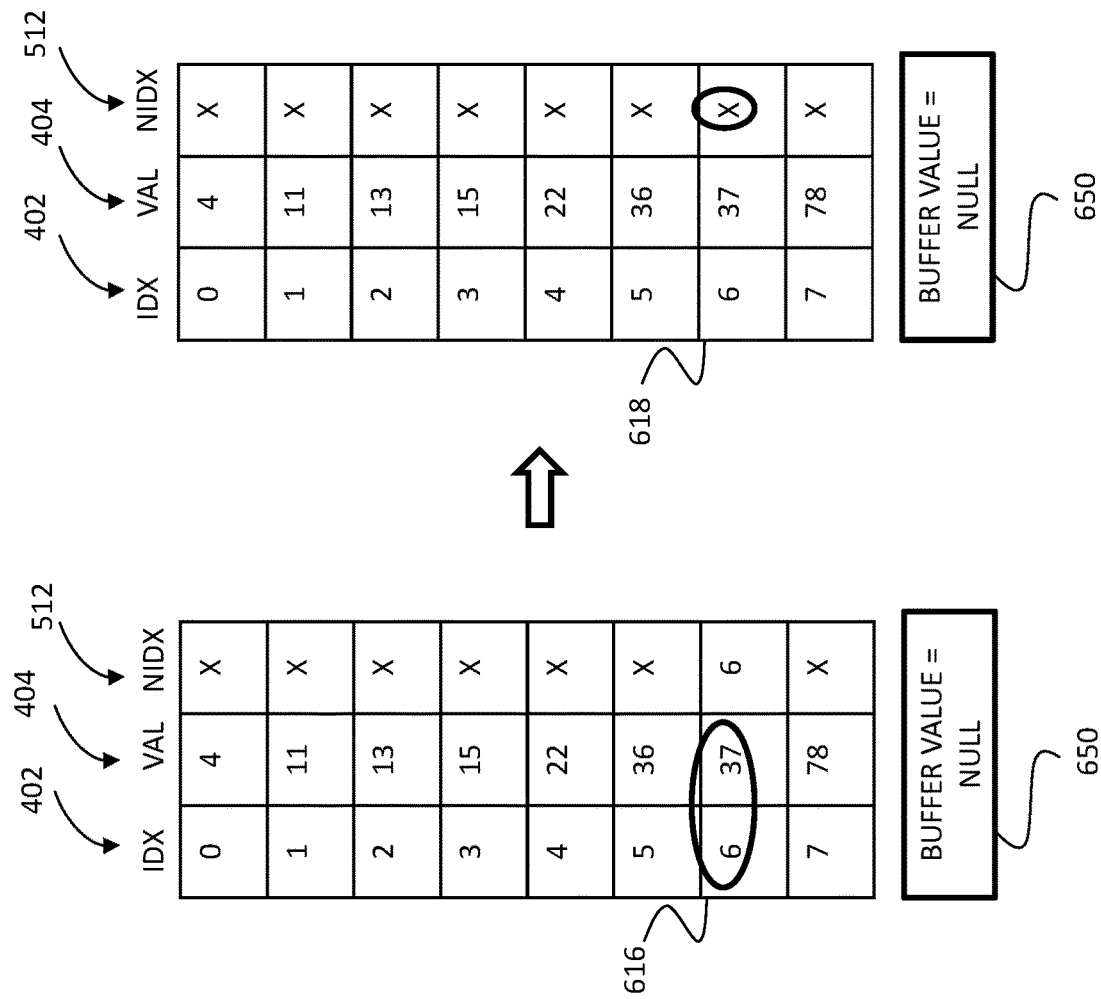

Reference is now also made to FIGS. 6A-6C which show an example of the complete sequence of index assignments carried out by element value assigner module 212, according to an embodiment of the present invention. Shown in table 600 are IDX array 402, VAL array 404, and NIDX 512 in an initial state as per table 520 in FIG. 5B. It is noted that every permutation made includes the same permutation in the elements array.

As previously described with reference to 308, all the numerical values in VAL array 404 may have their corresponding index values in IDX array 402 replaced by the index values in NIDX array 512. That is, VAL=15 may be assigned an index value of 3 instead of 0, VAL=22 may be assigned an index value of 4 instead of 1, VAL=4 may be assigned an index value of 0 instead of 2, VAL=13 may be assigned an index value of 2 instead of 3, VAL=78 may be assigned an index value of 7 instead of 4, VAL=11 may be assigned an index value of 1 instead of 5, VAL=37 may remain with its previous index value of 6, and VAL=36 may be assigned an index value of 5 instead of 7.

Shown in table 602 is, starting with the first index value IDX=0 in IDX array 402, the assignment of VAL=15 in VAL array 404 to IDX=3 in IDX array 402. As the numerical value has now been assigned to IDX array 402 a null ("X") is placed in NIDX array 512. Furthermore, as IDX=3 in IDX array 402 was previously assigned to VAL=13 and now it corresponds to VAL=15, VAL=13 is placed in a buffer 650.

Shown in table 604 is the assignment of the value in buffer 650, VAL=13 to IDX=2 in IDX array 402. As the numerical value has now been assigned to IDX array 402 a null ("X") is placed in NIDX array 512. Furthermore, as IDX=2 in IDX array 402 was previously assigned to VAL=4 and now it corresponds to VAL=13, VAL=4 is placed in buffer 650.

Shown in table 606 is the assignment of the value in buffer 650, VAL=4 to IDX=0 in IDX array 402. As the numerical value has now been assigned to IDX array 402 a null ("X") is placed in NIDX array 512. Furthermore, as IDX=0 in IDX array 402 was previously assigned a null ("X") when VAL=15 was assigned (as indicated by "X"), no VAL is placed in buffer 650.

Shown in table 608 is the assignment of the value VAL=22 corresponding to the next sequential index value IDX=1 in IDX array 402 to IDX=4 in the array. As the numerical value has now been assigned to IDX array 402 a null ("X") is placed in NIDX array 512. Furthermore, as index value=4 in IDX array 402 was previously assigned to VAL=78 and now it corresponds to VAL=22, VAL=78 is placed in buffer 650.

Shown in table 610 is the assignment of the value in buffer 650, VAL=78 to IDX=7 in IDX array 402. As the numerical value has now been assigned to IDX array 402 a null ("X") is placed in NIDX array 512. Furthermore, as IDX=7 in IDX array 402 was previously assigned to VAL=36 and now it corresponds to VAL=78, VAL=36 is placed in buffer 650.

Shown in table 612 is the assignment of the value in buffer 650, VAL=36 to IDX=5 in IDX array 402. As the numerical value has now been assigned to IDX array 402 a null ("X") is placed in NIDX array 512. Furthermore, as IDX=5 in IDX array 402 was previously assigned to VAL=11 and now it corresponds to VAL=36, VAL=11 is placed in buffer 650.

Shown in table 614 is the assignment of the value in buffer 650, VAL=11 to IDX=1 in IDX array 402. As the numerical value has now been assigned to IDX array 402 a null ("X") is placed in NIDX array 512. Furthermore, as IDX=1 in IDX array 402 was previously assigned a null ("X") when VAL=22 was assigned (as indicated by "X"), no VAL is placed in buffer 650.

Shown in table 616 is the assignment of the value VAL=36 corresponding to the next sequential index value which has not been assigned, IDX=6 in IDX array 402. As may be appreciated from the table NIDX=6 in NIDX array 512 which is the same as IDX=6 in IDX array 402, therefore no assignment is required. A null ("X") is placed in NIDX array 512 as shown in table 618.

Shown in table 618 are both IDX array 402 and the VAL array 404 monotonically sorted in a non-decreasing arrangement, the result of the execution of the method of FIG. 3. It may then be appreciated that the monotonic function numerical values in the numerical value array corresponding to the elements in the elements array have been sorted using the monotonic non-decreasing function. Applying the operations presented in FIGS. 6A-6C to the elements array instead of the numerical values array, using the same IDX and NIDX values, may sort the elements array.

Applicant has further realized that the monotonic sort performed by the FSE using the method of FIG. 3 may not properly sort the numerical value array if negative values are used in the array. This may be due of the use of two's complement in the binary representation of the negative numerical values. As the most significant bit (MSB) in the negative numerical value is MSB=1, the LSD radix sort performed in method 300 in FIG. 3 at 302 and 304 may place the negative numbers at the end of the sorted of the OIDX array.

Applicant has further realized that the above problem when sorting negative numerical values may be solved by shifting the NIDX values in the generated NIDX (method 300 in FIG. 3 at 306). All NIDX which may point to negative numerical values in the numerical value array may be shifted forward to the beginning of the array by adding a negative shift to each one of the NIDX values: the total number of NIDX pointing to non-negative numerical values. All NIDX which may point to non-negative numerical values in the numerical value array may be shifted backwards to the end of the array by adding to each one of the NIDX values the total number of NIDX pointing to negative numerical values. Optionally, the forward and backward shift may be determined by counting the number of cells in the number value array with non-negative numerical values and negative values, respectively.

Figure 7:
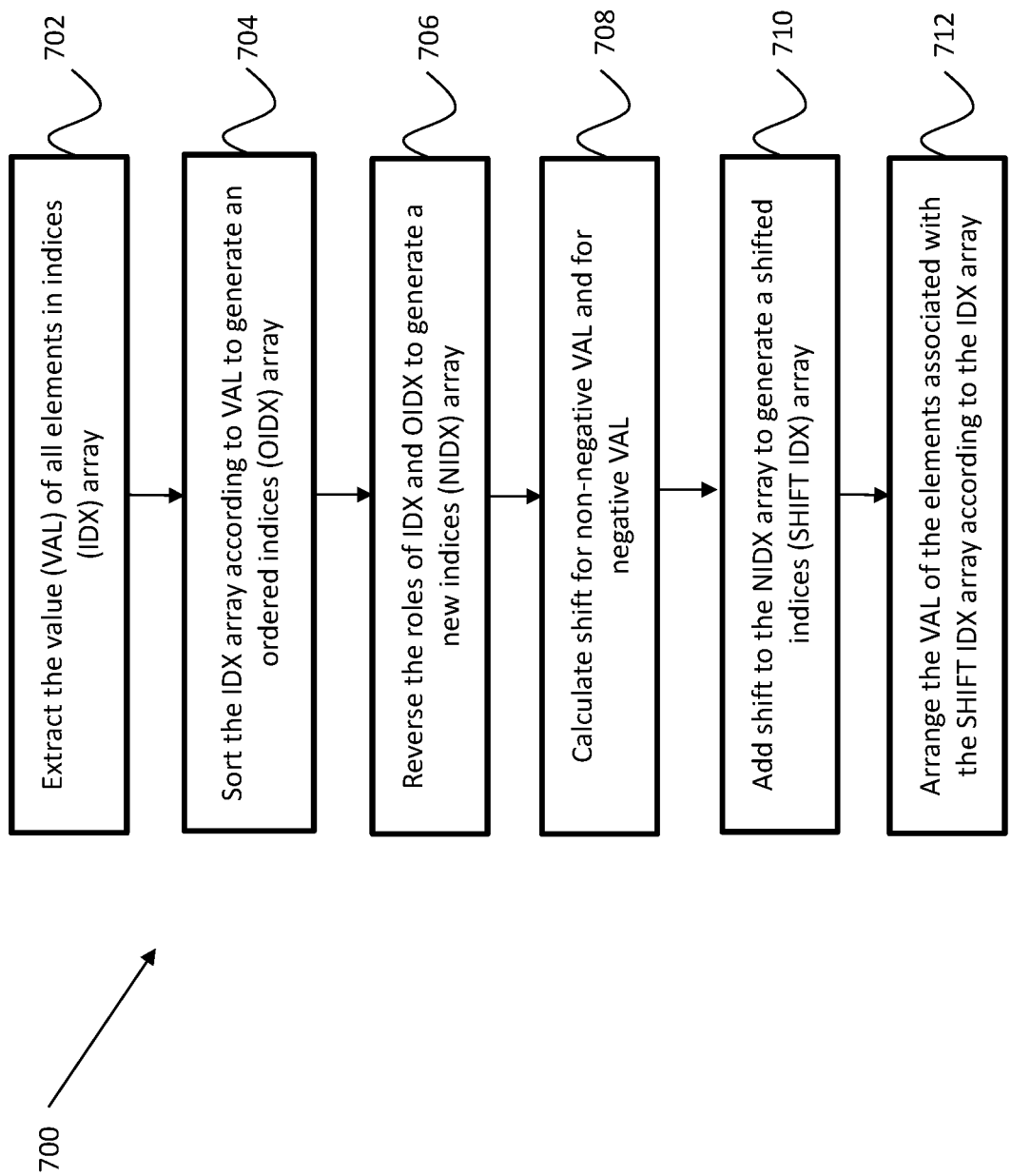
FIG. 7 illustrates a flow chart of a method of monotonically sorting using a non-decreasing function an array of elements including negative number values using the element value extractor module, the index sorting & generating module, the element value assigner module, and an index shifting module, all in the FSE, according to an embodiment of the present invention.
Figure 8A:
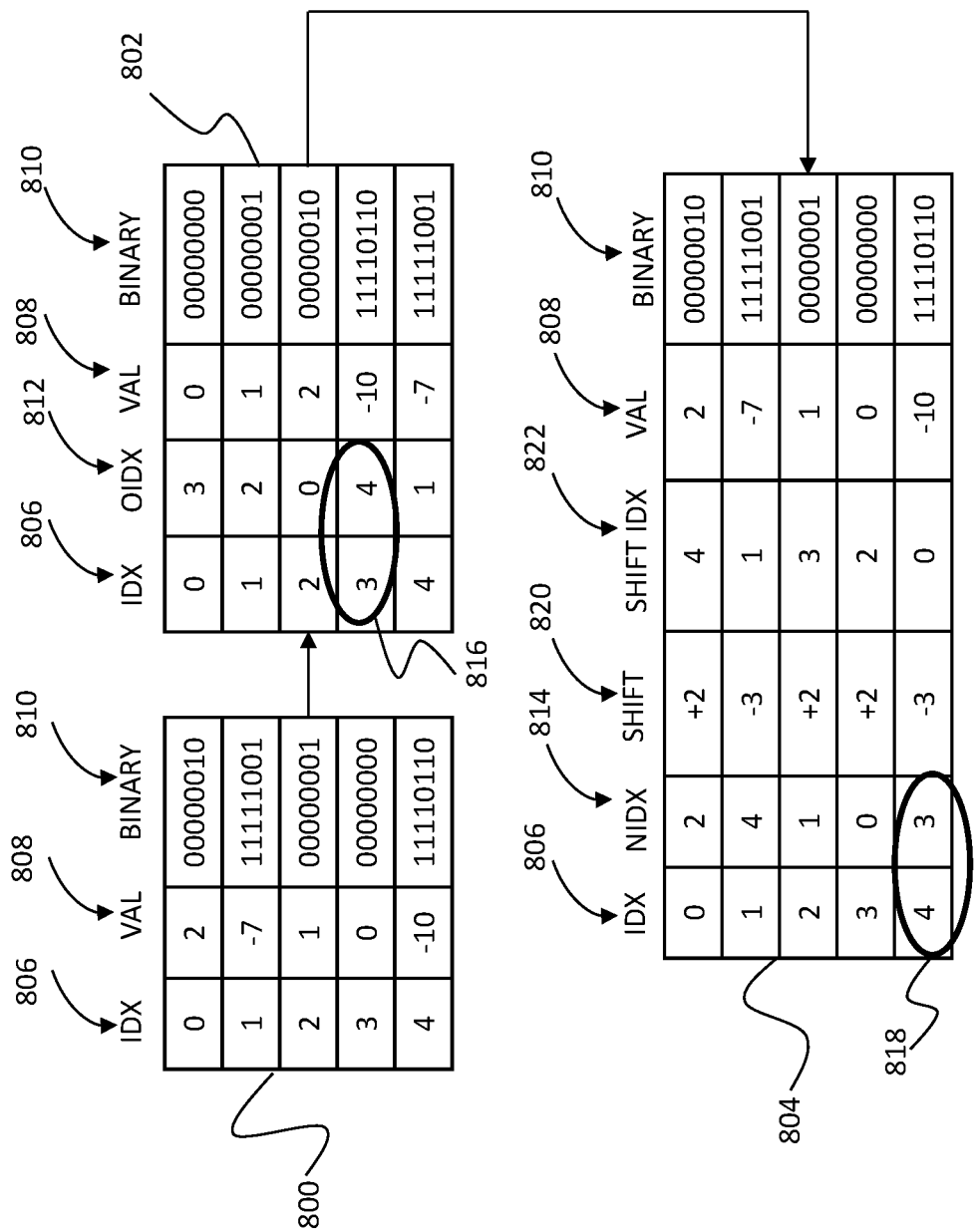
FIGS. 8A and 8B show examples of the execution of the method of FIG. 7 by the FSE, according to an embodiment of the present invention.
Figure 8B:
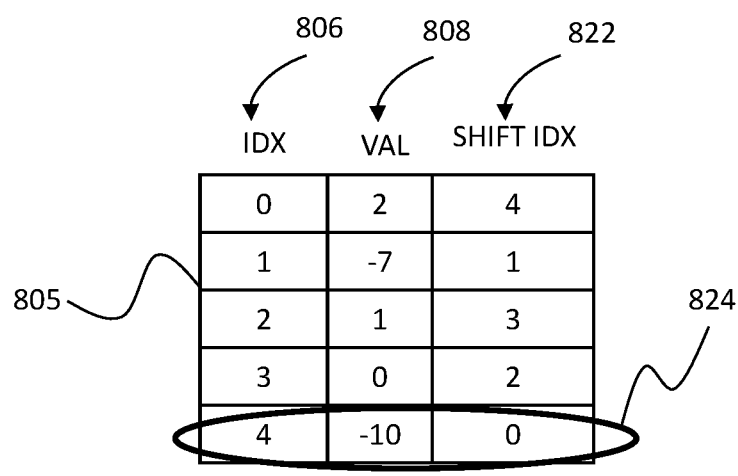

Reference is now made to FIG. 7 which illustrates a flow chart of a method 700 of monotonically sorting, using a non-decreasing function, an array of elements including negative number values using modules 208-214, according to an embodiment of the present invention. Reference is also made to FIGS. 8A and 8B which show examples of the execution of method 700 by FSE 200, according to an embodiment of the present invention.

At 702, element value extractor module 208 may apply the monotonic function to the elements and may extract from the numerical value array the numerical value (VAL) associated with the unsorted elements in the elements array according to the indices (IDX) array. The extraction may be sequential and may follow the order of the indices in the IDX array (e.g. ascending order). An example of this operation is shown in an exemplary table 800 including the IDX array 806 with the index values, the VAL array 808 with the numerical values VAL corresponding to each IDX and including negative numerical values, and the binary array 810 including the binary representation for each numerical value. As may be appreciated, in the table, the binary representation for the negative numbers uses the two's complements method.

At 704, sorting and generating module 210 may sort the VAL in the numerical value array in numerical order (e.g. ascending order) and may correspondingly rearrange the IDX in the indices array accordingly to generate an "ordered" indices (OIDX) array. Each permutation made on the numerical value array may be made on the indices array as well. An example of the rearranging operation is shown in an exemplary table 802 which shows IDX array 806, OIDX array 812, sorted VAL array 808, and sorted binary representation array 810. It may be appreciated from table 802 that the negative numbers have been sorted to the bottom of the table as the LSD radix sort is affected from the binary representation and the two's complements method.

At 706, sorting and generating module 210 may transform IDX and OIDX by reversing their roles to generate a new indices (NIDX) array. An example of the transformation operation is shown in an exemplary table 804 which shows the reversal of the roles between the IDX array 806 and OIDX 812 in table 802 to generate a new indices (NIDX) array 814. For example, IDX=3, OIDX=4, indicated by 816 is transformed to IDX=4, NIDX=3, indicated by 818.

At 708, shifting module 214 may calculate the shift 820 to be applied to each NIDX value in NIDX array 814. For example, as there are 3 non-negative numerical values and 2 negative numerical values, the shift is −3 for NIDX pointing to negative numerical values and +2 for NIDX pointing to non-negative numerical values in numerical value array 808, as shown in shift array 820.

At 710, shifting module 214 may generate a new shift IDX array 822 including shift IDX values by adding to each NIDX value in NIDX array 814 the negative or non-negative shift value in shift array 820. This new shift IDX array 822 now points to the corresponding numerical values in numerical value array in a way that places the negative numerical values in the beginning of the array.

At 712, element value assigner module 212 may assign the numerical value in the original IDX array the corresponding new index value in the shift IDX array. An example of the assignment is shown in FIG. 8B at table 805 which shows the original IDX array 806, the VAL array 808 corresponding to the IDX array, and the shift IDX array 822 with the index values which are to be assigned the corresponding numerical values in the VAL array. For example, as shown in 824, VAL=−10 having an original IDX=4 may now be assigned shift IDX=0. The complete sequence of index assignments carried out by element value assigner module 212 may follow a similar procedure to that shown in FIGS. 6A-6C with the exception that the NIDX array 512 in the figure may be replaced with the shift IDX array 822 in FIGS. 8A and 8B.

Applicant has additionally realized that the fast sort engine may use an out-of-place insertion method to do parallel sorting of an input array in one or more CPUs. Similarly to the previously described monotonically sorting method, an OIDX array is generated but instead of generating a NIDX and making in-place assignments, an auxiliary array may be created with the OIDX in a different area of the memory. That is, the OIDX may serve as the NIDX in the previously described method. The method may be particularly advantageous as it does not make in-place assignments on the elements array. For example, if there is an array with 20 elements where there are 10 monotonic values that are smaller than X and 10 monotonic values that are larger than X, they may be sorted in parallel and the results may be copied to the elements array. Elements in the elements array associated with monotonic values larger than X must follow those that are smaller than X because the monotonic function preserves the order. Consequently, the elements with monotonic values that are smaller than X may be copied to the first 10 places in the elements array and the elements with monotonic values that are larger than x to the next 10 places in the elements array. Alternatively the elements array may be split arbitrarily into several sub-arrays which may be sorted in parallel and then merged into the elements array.

Figure 9:
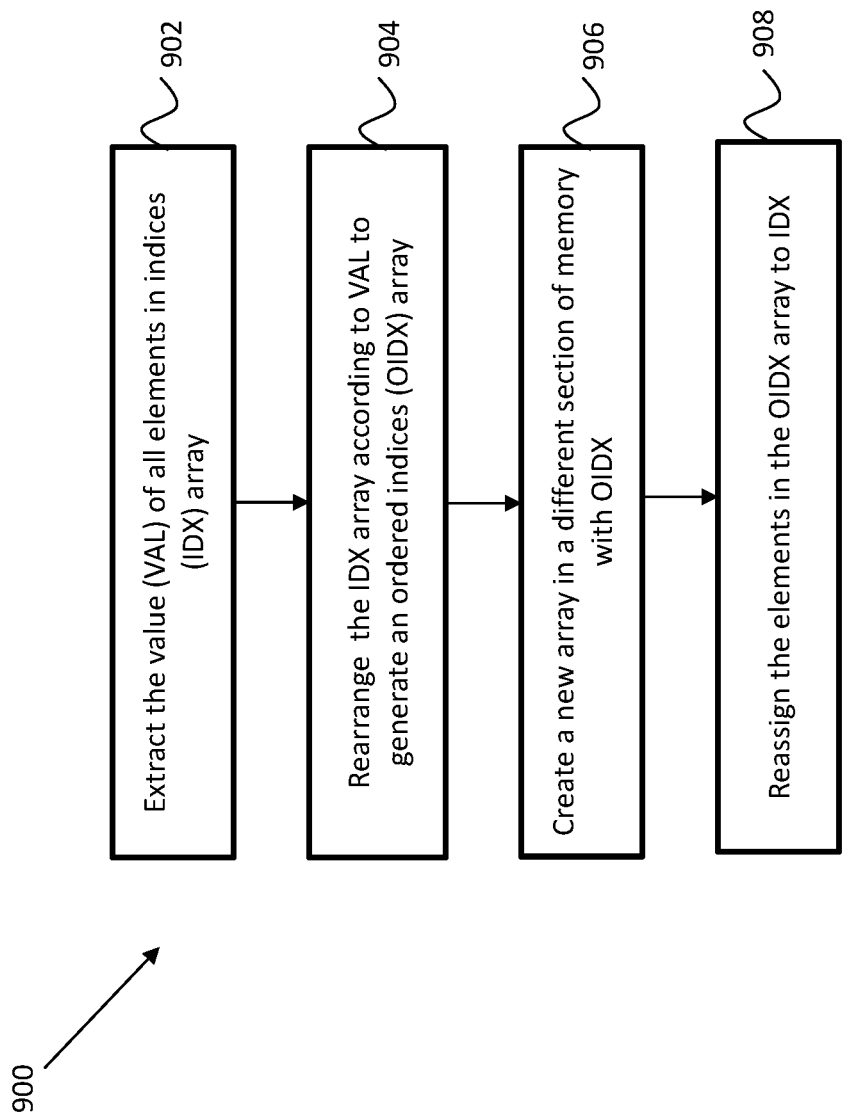
FIG. 9 is a flow chart of an exemplary method of monotonically sorting the array of elements using an out-of-place insertion method, according to an embodiment of the present invention.

Reference is now made to FIG. 9 which is a flow chart of an exemplary method 900 of monotonically sorting the array of elements using the out-of-place insertion method, according to an embodiment of the present invention. In performing the out-of-place insertion method, some or all of the components shown in the block diagram of FSE 200 may be used, optionally additional components may be used including additional processors 202.

At 902, the same actions described at 302 of FIG. 3 are performed.

At 904, the same actions described at 304 of FIG. 3 are performed.

At 906, the OIDX array may be written into a different section of memory 204.

At 908, rearrange the numerical values in the OIDX array into the corresponding IDX array. Referring back to FIGS.

4A-4C, the element associated with monotonic function value 4 and OIDX=2 may now be assigned to IDX=0 (in the auxiliary array); the element associated with monotonic function value 11 and OIDX=5 may now be assigned to IDX=1 (in the auxiliary array); the element associated with monotonic function value 13 and OIDX=3 may now be assigned to IDX=2 (in the auxiliary array); the element associated with monotonic function value 15 and OIDX=0 may now be assigned to IDX=3 (in the auxiliary array); the element associated with monotonic function value 22 and OIDX=1 may now be assigned to IDX=4 (in the auxiliary array); the element associated with monotonic function value 36 and OIDX=7 may now be assigned to IDX=5 (in the auxiliary array); the element associated with monotonic function value 37 and OIDX=6 may now be assigned to IDX=6 (in the auxiliary array); and the element associated with monotonic function value 78 and OIDX=4 may now be assigned to IDX=7 (in the auxiliary array). Finally the auxiliary array may be copied to the elements array.

For negative monotonic function number values, the shifting process described with reference to FIGS. 8A and 8B may be similarly performed for the out-of-place insertion method using OIDX instead of NIDX. The shift and SHIFT IDX may be similarly computed as described with reference to the mentioned figures.

Figure 10A:
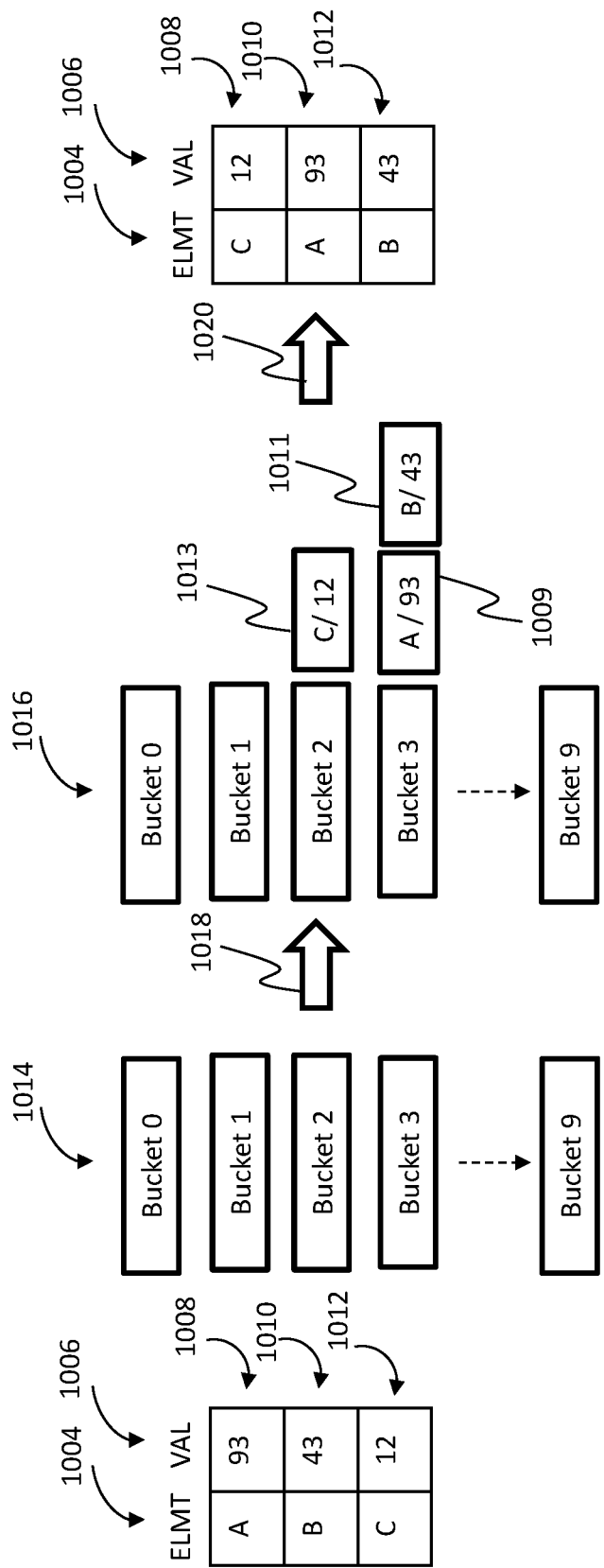
FIGS. 10A and 10B schematically illustrate an exemplary operation of the fast sort engine performing a LSD radix sort directly on an input (elements) array, according to an embodiment of the present invention.
Figure 10B:
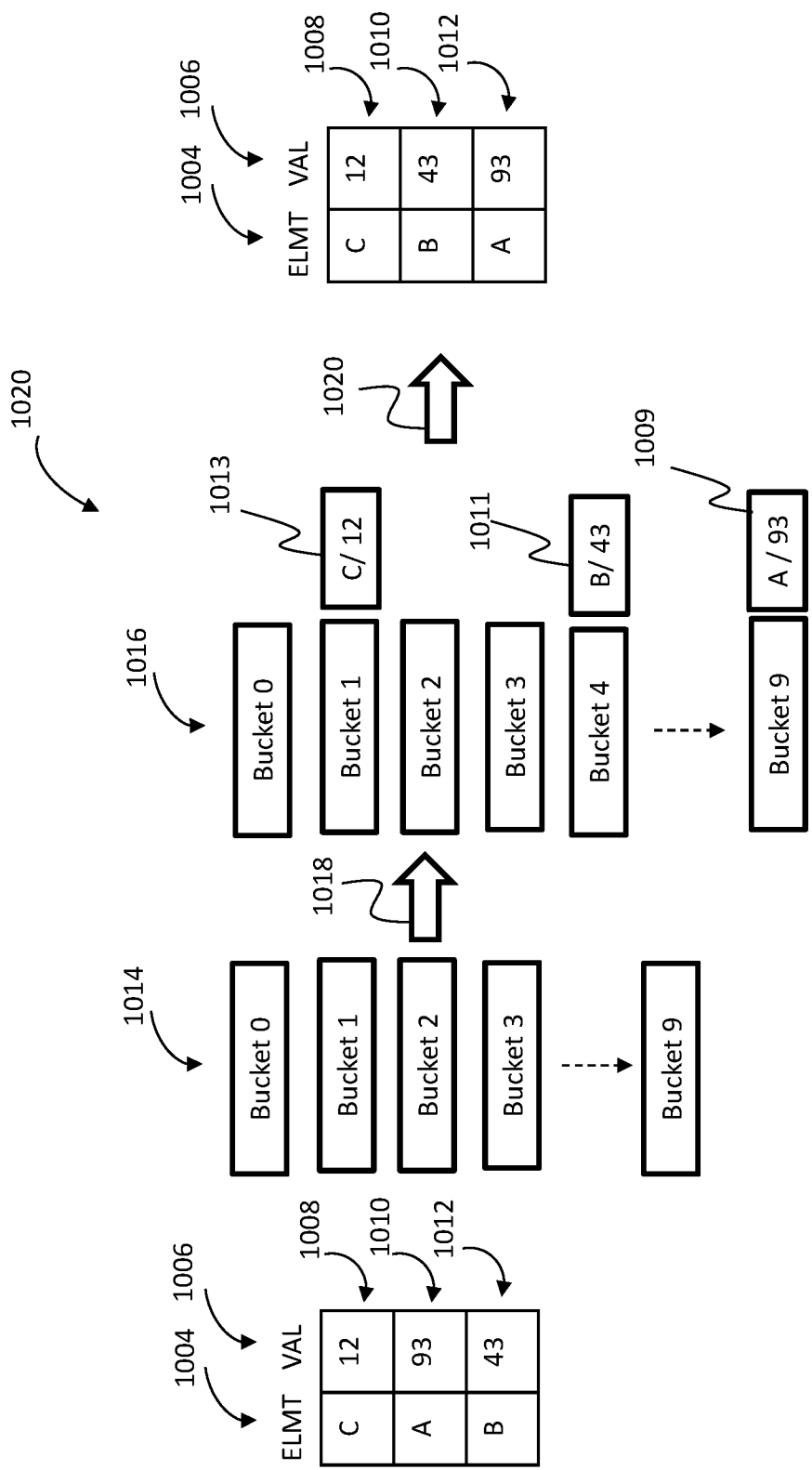

Reference is now made to FIGS. 10A and 10B which schematically illustrate an exemplary operation of fast sort engine 200 performing a LSD radix sort directly on an input (elements) array, according to an embodiment of the present invention. In performing the LSD radix direct sort method, some or all of the components shown in the block diagram of FSE 200 may be used, including additional components such as, for example, one or more processors 202. Furthermore, sorting and generating module 210 and shifting module 214 may perform sorting and shifting functions on the input array, respectively, some of which may be similar to those previously described with reference to the index array. Additionally, although the operation of fast sort engine 200 is described herein with reference to making permutations on a monotonic function values array, in some embodiments, the operation of the fast sort engine may not include creating the monotonic function values array rather associating the values with its corresponding element and only sorting the input array.

In FIG. 10A may be seen a first step in the exemplary LSD radix direct sort operation performed on an exemplary elements (ELMT) array 1004 having three elements A, B, C, and a monotonic function values (VAL) array 1006 having values of 93, 43, and 12. Element A occupies row 1008 in ELMT array 1004 and is assigned the monotonic function value 93, element B occupies row 1010 in the elements array and is assigned the monotonic function value 43, and element C occupies row 1012 in the elements array and is assigned the monotonic function value 12. Ten empty buckets 1014 labelled "Bucket 0" through "Bucket 9" are used to perform the LSD radix direct sort operation.

In a first sort step, as indicated by arrow 1018, the elements are sorted into the buckets according to the units digit of the corresponding numerical value which is the LSD. The ten buckets including the elements, shown as buckets 1016, now hold in Bucket 2 the element C as its corresponding monotonic value is 12, indicated as C/12 1013; and in Bucket 3 the elements A and B as their corresponding monotonic values are 93 and 43, indicated as A/93 1009 and B/43 1011, respectively. Following the first sort step, the elements are then copied from the buckets back into the ELMT 1004 following the order of the buckets, as shown by arrow 1020, so that row 1008 in the elements array 1004 now holds element C, row 1010 holds element A, and row 1012 holds element B.

In FIG. 10B may be seen a second and final step in the exemplary LSD radix direct sort operation performed on the exemplary ELMT array 1004. In this step, the elements in ELMT array 1004 from the end of the previous step are sorted into the buckets according to the tens digit of the corresponding numerical value which is now the next LSD. The ten buckets including the elements, shown as buckets 1016, now hold in Bucket 1 the element C as its corresponding monotonic value is 12, indicated as C/12 1013; in Bucket 4 the element B as its corresponding monotonic values is 43, indicated as B/43 1011; and Bucket 9 the element C as its corresponding monotonic values is 93, indicated as A/43 1009. Following this second and final sort step, the elements are then copied from the buckets back into the ELMT array 1004 following the order of the buckets, as shown by arrow 1020, so that row 1008 in the elements array 1004 now holds element C, row 1010 holds element B, and row 1012 holds element C, and the input array has been sorted. For negative monotonic function number values, the elements corresponding to the negative monotonic values may be copied to a temporary array in the same order they reside in the elements array, and the elements corresponding to the non-negative monotonic values may be shifted towards the end of the elements array. The elements corresponding to the negative monotonic values may then be copied from the temporary array to the beginning of the elements array in the same order they reside in the temporary array. Optionally, the size of the shift may be determined by counting the number of elements in the elements array corresponding to negative monotonic values. Alternatively, the elements corresponding to the non-negative values may be copied to the temporary buffer and the elements that correspond to the negative monotonic values may be shifted to the beginning of the array. For example, if there is an array with 20 elements where there are 5 elements corresponding to negative monotonic values, after performing the LSD radix sort on the array, the 5 elements corresponding to the negative monotonic values may be copied to a temporary array and the remaining 15 elements may be pushed 5 places towards the end of the array. The elements in the temporary array may then be copied to the beginning of the array and occupy the 5 first places.

The fast sort engine operation previously described in FIGS. 10A and 10B used ten buckets for exemplary purposes. The skilled person may readily appreciate that the fast sort engine operation may include use of a greater number of buckets, for example 256 buckets which may correspond with the number of bits in a byte. For words with lengths greater than a byte, for example, a 16-bit word, a 32-bit word, or a 64-bit word, the words may be split into bytes and the LSD radix sort may be performed on each byte, optionally on a group of bytes.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

The foregoing description and illustrations of the embodiments of the invention has been presented for the purposes of illustration. It is not intended to be exhaustive or to limit the invention to the above description in any form.

Any term that has been defined above and used in the claims, should be interpreted according to this definition.

The invention claimed is:

1. A method for accelerated radix sorting of an array of unsorted data elements in a computer system that includes a processor configured to execute an instruction set and a memory, the method comprising:
storing the array of unsorted data elements in the memory;
using the processor, generating and storing in the memory an array of index values, each index value associated with an unsorted data element and a location of said unsorted data element in the unsorted data elements array;
using the processor, generating and storing in the memory an array of monotonic function values, wherein a monotonic function value is assigned to each of said unsorted data elements in said unsorted data elements array;
using the processor establishing a correspondence between each index value in said index values array and each monotonic function value in said monotonic function values array, wherein each index value and the corresponding monotonic function value are associated with a same unsorted data element;
using the processor sorting the monotonic function values in said stored monotonic function values array using a Radix sort, and storing in the memory said sorted monotonic function values array;
using the processor sorting said index values in said stored index values array according to its corresponding monotonic function value, and storing in the memory said sorted index values array;
using the processor generating and storing in the memory an array of new index values, each new index value associated with a monotonic function value in said sorted monotonic function values array and with said monotonic value's corresponding index value in said sorted index values array, each new index value corresponding with a new location in memory for each unsorted data element in said unsorted data elements array; and
using said processor sorting said unsorted data elements from their original location in the memory associated with said index values in said index values array to a new location in the memory associated with said new index values in said new index values array.

2. The method according to claim 1 wherein said monotonic function is a non-decreasing monotonic function.

3. The method according to claim 1 wherein said monotonic function is a non-increasing monotonic function.

4. The method according to claim 1 wherein said Radix sort comprises a least significant digit (LSD) Radix sort.

5. The method according to claim 1 wherein each sorted index value in said sorted index values array corresponds to a monotonic function value in said sorted monotonic function values array, wherein each sorted index value and the corresponding monotonic function value are associated with a same unsorted data element in said unsorted data elements array.

6. The method according to claim 1 comprising swapping said sorted index values in said sorted index values array with said new index values in said new index values array.

7. The method according to claim 1 further comprising using Radix sort buckets.

8. The method according to claim 7 comprising sorting the data elements into said Radix sort buckets by sorting said assigned monotonic function values.

9. The method according to claim 1 wherein said assigned monotonic function values comprise negative numerical values.

10. The method according to claim 1 wherein said monotonic function values are integers.

11. A computer system for accelerated radix sorting of an array of unsorted data elements comprising:
a processor;
a memory; and
a non-transitory computer readable medium storing instructions executable in said processor and causing said processor to perform operations comprising:
storing the array of unsorted data elements in the memory;
using the processor, generating and storing in the memory an array of index values, each index value associated with an unsorted data element and a location of said unsorted data element in the unsorted data elements array;
using the processor, generating and storing in the memory an array of monotonic function values, wherein a monotonic function value is assigned to each of said unsorted data elements in said unsorted data elements array;
using the processor establishing a correspondence between each index value in said index values array and each monotonic function value in said monotonic function values array, wherein each index value and the corresponding monotonic function value are associated with a same unsorted data element;
using the processor sorting the monotonic function values in said stored monotonic function values array using a Radix sort, and storing in the memory said sorted monotonic function values array;
using the processor sorting said index values in said stored index values array according to its corresponding monotonic function value, and storing in the memory said sorted index values array;

using the processor generating and storing in the memory an array of new index values, each new index value associated with a monotonic function value in said sorted monotonic function values array and with said monotonic value's corresponding index value in said sorted index values array, each new index value corresponding with a new location in memory for each unsorted data element in said unsorted data elements array; and using said processor sorting said unsorted data elements from their original location in the memory associated with said index values in said index values array to a new location in the memory associated with said new index values in said new index values array.

12. The system according to claim 11 wherein said monotonic function is a non-decreasing monotonic function.

13. The system according to claim 11 wherein said monotonic function is a non-increasing monotonic function.

14. The system according to claim 11 wherein said Radix sort comprises a least significant digit (LSD) Radix sort.

15. The system according to claim 11 further comprising said processor creating an array of sorted index values, each sorted index value in said sorted index values array corresponding to a monotonic function value in said sorted monotonic function values array, wherein each sorted index value and the corresponding monotonic function value are associated with a same unsorted data element in said unsorted data elements array.

16. The system according to claim 11 comprising said processor swapping said sorted index values in said sorted index values array with said new index values in said new index values array.

17. The system according to claim 11 further comprising said processor using Radix sort buckets.

18. The system according to claim 17 comprising said processor sorting the data elements into said Radix sort buckets by sorting said assigned monotonic function values.

19. The system according to claim 11 wherein said assigned monotonic function values are integers.

20. A non-transitory computer readable medium storing instructions for accelerated radix sorting of an array of unsorted data elements in a computer system, the instructions executable in a processor and causing the processor to perform operations comprising:

storing the array of unsorted data elements in the memory;

using the processor, generating and storing in the memory an array of index values, each index value associated with an unsorted data element and a location of said unsorted data element in the unsorted data elements array;

using the processor, generating and storing in the memory an array of monotonic function values, wherein a monotonic function value is assigned to each of said unsorted data elements in said unsorted data elements array;

using the processor establishing a correspondence between each index value in said index values array and each monotonic function value in said monotonic function values array, wherein each index value and the corresponding monotonic function value are associated with a same unsorted data element;

using the processor sorting the monotonic function values in said stored monotonic function values array using a Radix sort, and storing in the memory said sorted monotonic function values array;

using the processor sorting said index values in said stored index values array according to its corresponding monotonic function value, and storing in the memory said sorted index values array;

using the processor generating and storing in the memory an array of new index values, each new index value associated with a monotonic function value in said sorted monotonic function values array and with said monotonic value's corresponding index value in said sorted index values array, each new index value corresponding with a new location in memory for each unsorted data element in said unsorted data elements array; and using said processor sorting said unsorted data elements from their original location in the memory associated with said index values in said index values array to a new location in the memory associated with said new index values in said new index values array.

* * * * *